US007752357B2

(12) United States Patent
Shintani

(10) Patent No.: US 7,752,357 B2
(45) Date of Patent: Jul. 6, 2010

(54) HIGH-DEFINITION MULTIMEDIA INTERFACE RECEIVER/TRANSMITTER CHIPSET

(75) Inventor: Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 175 days.

(21) Appl. No.: 11/953,570

(22) Filed: Dec. 10, 2007

(65) Prior Publication Data

US 2009/0147135 A1 Jun. 11, 2009

(51) Int. Cl.
*G06F 3/00* (2006.01)
*H04F 1/38* (2006.01)

(52) U.S. Cl. ........................................ 710/52; 375/220

(58) Field of Classification Search ................. 710/310, 710/305-306, 100, 52, 316; 726/27; 375/220, 375/224

See application file for complete search history.

(56) References Cited

U.S. PATENT DOCUMENTS 6,941,395 B1 * 9/2005 Galang et al. ................. 710/65
2007/0052869 A1 * 3/2007 Priest ......................... 348/735
2007/0242742 A1 * 10/2007 Biman et al. ................ 375/233
2008/0072333 A1 * 3/2008 Chen ........................... 726/27
2008/0106306 A1 * 5/2008 Keady et al. ................ 327/100
2009/0301755 A1 * 12/2009 Shintani .................. 174/117 F

FOREIGN PATENT DOCUMENTS

WO WO 2007/023939 A1 3/2007

OTHER PUBLICATIONS

Silicon Image: "3:1 HDM1 1.3 Switch with Integrated CEC Functionality" product Mar. 13, 2007, Retrieved from the Internet: URL:http://www.siliconimage.com/docs/Sil9185_PB_Final_4-18-07.pdf [retrieved on Mar. 23, 2010].

* cited by examiner

*Primary Examiner*—Khanh Dang
(74) *Attorney, Agent, or Firm*—Dickstein Shapiro LLP

(57) ABSTRACT

A buffer chip is used to isolate the internal connection between an HDMI receiver chip and a remotely-located HDMI port in a consumer electronic device. In one embodiment, an HDMI receiver/transmitter circuit is coupled to a main processor via an internal bus. The HDMI receiver/transmitter circuit, which includes one or more local HDMI inputs/outputs, is further electrically coupled to an HDMI buffer chip, which is in turn connected to one or more HDMI ports located remotely from the HDMI receiver/transmitter circuit. In one embodiment, the detection and control of the HDMI buffer chip is provided directly by the HDMI receiver/transmitter circuit. In another embodiment, the HDMI buffer chip may be electrically isolated from the device's main processor.

16 Claims, 3 Drawing Sheets

HIGH-DEFINITION MULTIMEDIA INTERFACE RECEIVER/TRANSMITTER CHIPSET

FIELD OF THE INVENTION

The present invention relates in general to receiver and transmitter chipsets and more particularly to an improved High-Definition Multimedia Interface receiver/transmitter chipset.

BACKGROUND

As the High-Definition Multimedia Interface (HDMI) becomes more and more ubiquitous, the number of HDMI ports on consumer electronic devices continues to increase. However, in devices having multiple HDMI ports not all of the input/output (I/O) ports may be physically located near the HDMI receiver/transmitter chip. This may occur, for example, with the use of side and/or front HDMI I/O ports. Unfortunately, due to compliance testing requirements, it is often difficult to merely string a copper connection from the HDMI receiver/transmitter chip to such remotely-located HDMI I/O ports. Such compliance testing typically includes display data channel (DDC) bus capacitance, Transition Minimized Differential Signaling (TMDS) line characteristic impedance and consumer electronics control (CEC) bus capacitance.

One solution has been to install a buffer chip to isolate the internal copper connection between the HDMI receiver/transmitter chip and the HDMI port itself. This has the effect of reducing signal attenuation caused by the long cable run between the remotely-located HDMI port(s) and the HDMI receiver/transmitter chip. However, in order to function correctly, such buffer chips have to be detected and controlled by the device's main processor. As a result, a significant amount of processing overhead tends to be added to the main processor. Also, additional control lines have to be fanned out from the main processor to the buffer chip, thereby adding to the complexity and expense of the system. Thus, what is needed is an improved HDMI receiver/transmitter chipset.

BRIEF SUMMARY OF THE INVENTION

Disclosed and claimed herein are consumer electronic devices and chipsets configured in accordance with the principles of the invention. In one embodiment, a display device includes a main processor, a high-definition multimedia interface (HDMI) receiver circuit electrically coupled to the main processor, and a buffer circuit electrically coupled to the HDMI receiver circuit, where the buffer circuit is configured to receive a control signal from the HDMI receiver circuit. The display device further includes a first HDMI input port electrically coupled to the buffer circuit and configured to provide an HDMI connection from a source device.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

One aspect of the present disclosure relates to a system architecture in which a buffer chip is used to isolate the internal connection between an HDMI receiver chip and a remotely-located HDMI port. In one embodiment, an HDMI receiver or transmitter circuit is coupled to a main processor via an internal bus. The HDMI receiver or transmitter circuit may include one or more local HDMI inputs or outputs. In addition, however, the HDMI receiver/transmitter circuit may be electrically coupled to an HDMI buffer chip, which is in turn connected to one or more HDMI ports located remotely from the HDMI receiver/transmitter circuit. In certain embodiments, the incorporation of an HDMI buffer chip may alleviate signal attenuation and be helpful in meeting HDMI-related compliance testing requirements.

Another aspect of the invention is to provide detection and control of the HDMI buffer chip by the HDMI receiver/transmitter circuit. As will be described in more detail below, the HDMI buffer chip may be completely decoupled from the main processor and under control of the HDMI receiver/transmitter circuit so as to minimize additional processing overhead that the main processor would otherwise incur, as well as eliminate the need for additional control lines to be provided from the main processor.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Exemplary Embodiments

Figure 1:
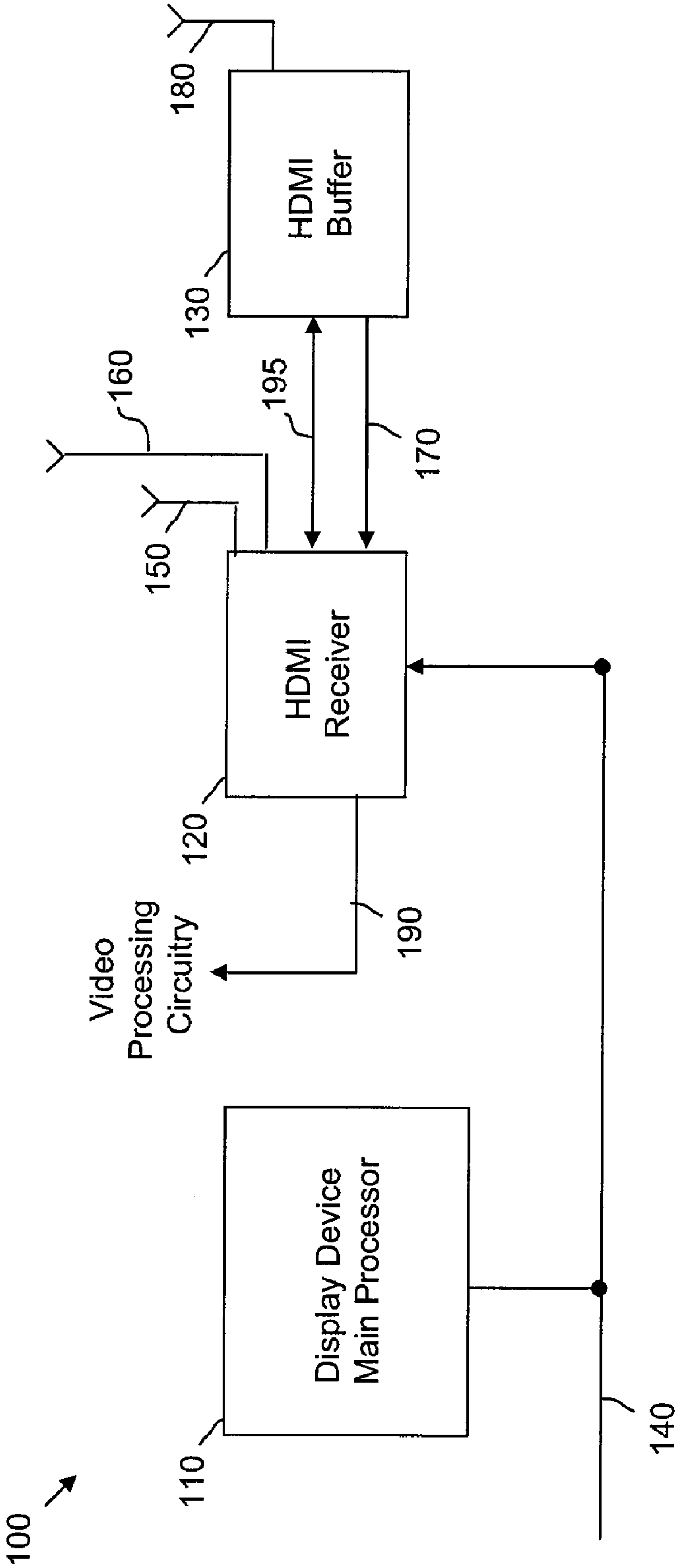
FIG. 1 is a block diagram of a system configured in accordance with one embodiment of the invention.

FIG. 1 depicts system 100 configured in accordance with the principles of the invention. In particular, system 100 includes HDMI-related circuitry of a display device (e.g., television, monitor, etc.). As will be described below, system 100 includes a buffer chip for isolating the internal connection between an HDMI receiver chip and a remotely-located HDMI input port.

System 100 includes main processor 110 for the display device and an HDMI receiver circuit 120, each coupled to a bus 140. The HDMI receiver circuit 120 includes a first HDMI input 150 corresponding to a first HDMI input port (not shown), and a second HDMI input 160 corresponding to a second HDMI input port (not shown). The HDMI inputs 150 and 160 enable the HDMI receiver circuit 120 to receive audio/video (AV) content from a source device (e.g., DVD, PVR, etc.) in accordance with the HDMI communication standard. Received AV content is then provided by the HDMI receiver circuit 120 via output 190 to the requisite video processing circuitry, the details of which are beyond the scope of this disclosure.

System 100 further includes HDMI buffer 130 having a third HDMI input 180 corresponding to a third HDMI input port (not shown) of the display device which is otherwise located remotely from the HDMI receiver circuit 120 (e.g., on the front or side of the display device). As previously mentioned, the HDMI buffer 130 may be helpful in meeting compliance testing requirements where there is a relatively large distance between the remotely-located third port and the HDMI receiver circuit 120.

Incoming AV content may be received by the buffer 130 via HDMI input 180. A corresponding AV signal may then be provided to the HDMI receiver circuit 120 via TMDS line 170. However, unlike HDMI buffers of the prior art, the HDMI buffer 130 of FIG. 1 is decoupled from the main processor 110. In fact, processor 110 may be completely unaware of the presence of the buffer chip 130. Still, in order to properly function, the HDMI buffer 130 must be detected and controlled in accordance with the specific design and signaling criteria for the display device. To that end, the HDMI receiver circuit 120 may provide both detection and control functionality of the buffer 130 via control line 195.

In one embodiment, the presence of the buffer chip 130 may be initially detected by the HDMI receiver circuit 120 via control line 195. Following an initial handshake, the HDMI receiver circuit 120 may then assume control of the buffer circuit 130, thereby eliminating the additional processing overhead that the main processor 110 would otherwise incur. Similarly, no additional control lines from the main processor 110 to the HDMI buffer chip 130 are needed.

While the overall processing overhead for the HDMI receiver 120 may increase due to the presence of the buffer chip 130, the overall power consumption of the HDMI receiver circuit 120 may actually remain relatively constant or even be reduced since the de-skew processing typically performed by the HDMI receiver circuit 120 will be unnecessary given the relatively short distance between the HDMI receiver circuit 120 and the buffer chip 130.

While the embodiment of FIG. 1 depicts the HDMI receiver circuit 120 has having two local HDMI inputs 150 and 160 and one remotely-located input 180 connected to the buffer 130, it should equally be appreciated that more or fewer HDMI inputs may be locally and/or remotely located from HDMI receiver circuit 120. For example, system 100 may include only a single remotely located HDMI input coupled to a buffer chip.

Figure 2A:
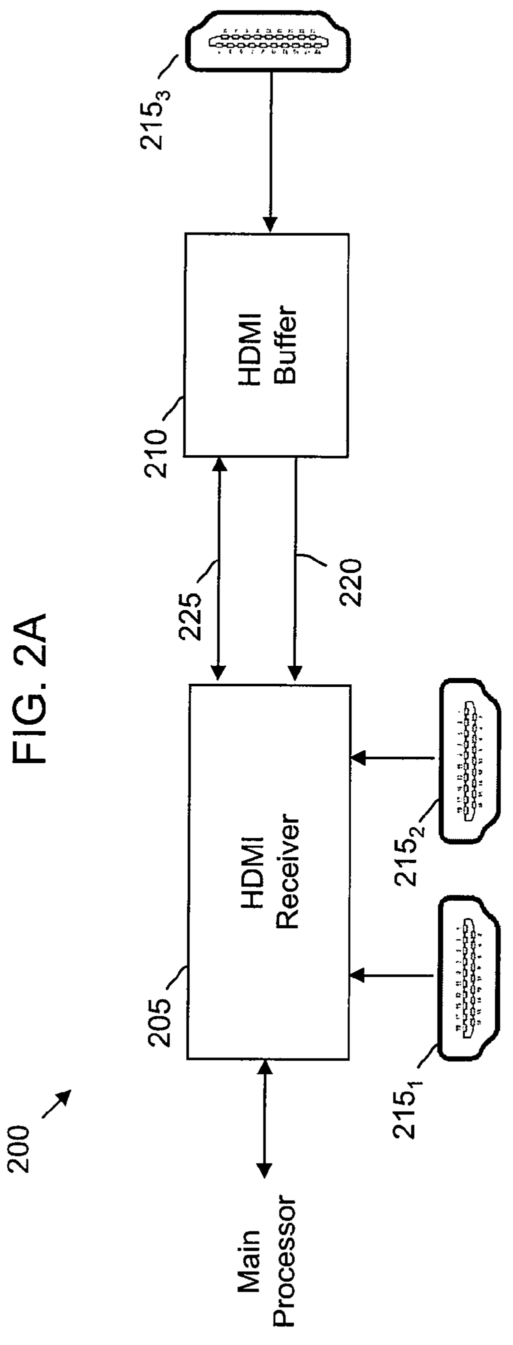
FIGS. 2A-2B depict block diagrams of receiver- and transmitter-based system respectively, each configured in accordance with one or more embodiments of the invention.

Referring now to FIG. 2A, depicted is another embodiment of a receiver-based system 200, such as may be implemented in a display device. System 200 includes an HDMI receiver circuit 205 coupled directly to a first HDMI input port $\mathbf{215}_1$ and a second HDMI input port $\mathbf{215}_2$, as shown. The HDMI inputs ports may be usable to provide the HDMI receiver circuit 205 with audio/video (AV) content received from a connected source device (not shown) in accordance with the HDMI communication standard. It should be appreciated that such received AV content may then be provided by the HDMI receiver circuit 205 to video processing circuitry (not shown) of the display device, as is typically known in the art.

In addition to being coupled to HDMI input ports $\mathbf{215}_1$ and $\mathbf{215}_2$, HDMI receiver circuit 205 is further electrically coupled to HDMI buffer 210, which itself is coupled to a third HDMI input port $\mathbf{215}_3$. In one embodiment, the HDMI input port $\mathbf{215}_3$ is remotely-located from the HDMI receiver circuit 205 (e.g., on a different side of the display device). As previously mentioned, the HDMI buffer 210 may be configured to alleviate the signal attenuation inherent in relatively longer cable runs, such as in the case of remotely-located ports (e.g., HDMI input port $\mathbf{215}_3$).

Continuing to refer to FIG. 2A, AV content may be received from a connected source device (not shown) by the HDMI buffer 210 via HDMI input port $\mathbf{215}_3$, and then provided to the HDMI receiver circuit 205 via TMDS line 220. However, in order for the HDMI buffer 210 to be able to properly buffer such AV content, detection and control of the HDMI buffer 210 is provided by the HDMI receiver circuit 205 via control line 225. That is, following initial detection of the HDMI buffer 210, the HDMI receiver circuit 205 may automatically assume control of the HDMI buffer 210, thereby eliminating the additional processing overhead that the main processor 110 would otherwise incur. Similarly, no additional control lines from or to the main processor are needed. In fact, the main processor of the display device may not be aware of the HDMI buffer 210.

While the embodiment of FIG. 2A depicts the HDMI receiver circuit 205 has having two local HDMI input ports $\mathbf{215}_1$ and $\mathbf{215}_2$ and one remotely-located input port $\mathbf{215}_3$ that is connected to the HDMI buffer 210, it should equally be appreciated that more or fewer HDMI input ports may be locally and/or remotely located from HDMI receiver circuit 205. By way of example, system 200 may include only a single remotely located HDMI input port coupled to the HDMI buffer circuit 210, which is in turn coupled to the HDMI receiver circuit 205. In another embodiment, system 200 may alternatively include another buffer circuit (not shown) connected to the HDMI buffer circuit 210.

Figure 2B:
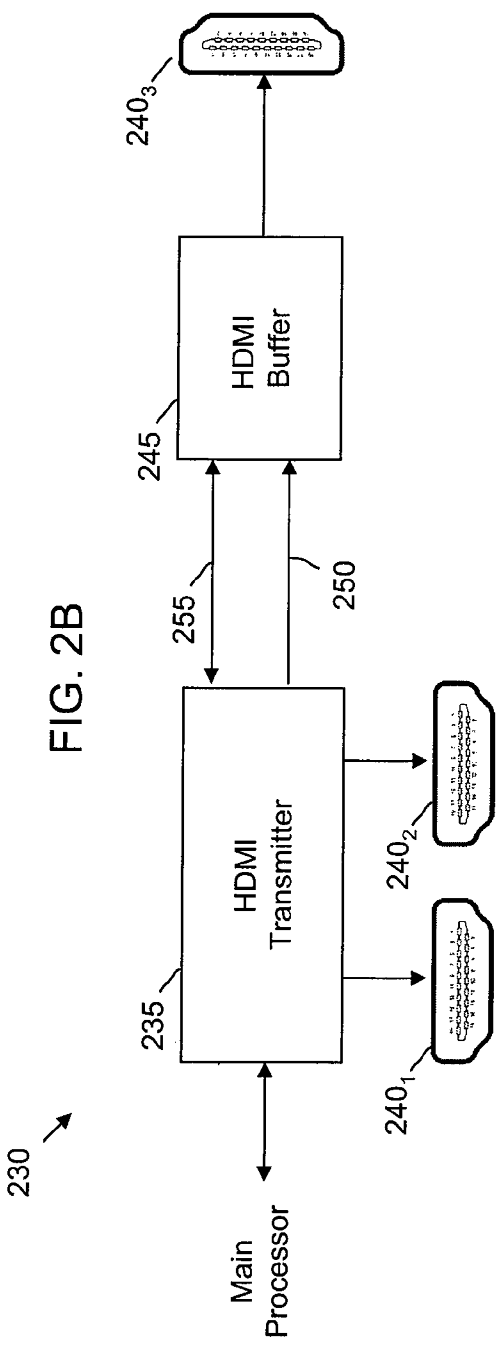

Referring now to FIG. 2B, depicted is one embodiment of a transmitter-based system 230, such as may be implemented by a source device or an AV receiver that provides AV content to a display device. As depicted in FIG. 2B, system 230 includes an HDMI transmitter circuit 235 coupled directly to a first HDMI output port $\mathbf{240}_1$ and a second output HDMI port $\mathbf{240}_2$. The HDMI output ports may be usable to provide audio/video (AV) content to one or more connected devices (e.g., display device). It should be appreciated that such received AV content may then be received by the HDMI transmitter circuit 235 from video processing circuitry or from other source devices that are routing AV content through the system 230.

In addition to being coupled to HDMI output ports $\mathbf{240}_1$ and $\mathbf{240}_2$, the HDMI transmitter circuit 235 is further electrically coupled to an HDMI buffer 245, which itself is coupled to an HDMI output port $\mathbf{240}_3$. In one embodiment, the HDMI output port $\mathbf{240}_3$ may be remotely-located from the HDMI transmitter circuit 235.

Continuing to refer to FIG. 2B, AV content may be received from a connected source device (not shown) by the HDMI receiver circuit 235, which is in turn provided to the HDMI buffer 245 via TMDS line 250. Additionally, HDMI buffer 245 may be detected and controlled by the connected HDMI receiver circuit 235 via control line 255, thereby reducing signal attenuation caused by the long cable run between the remotely-located HDMI output port $\mathbf{240}_3$ and the HDMI transmitter circuit 235.

It should further be noted that it may be desirable not to expose raw data when transmitting to a connected device. In such cases, the data received by HDMI buffer 245 may have been previously encrypted.

Figure 3:
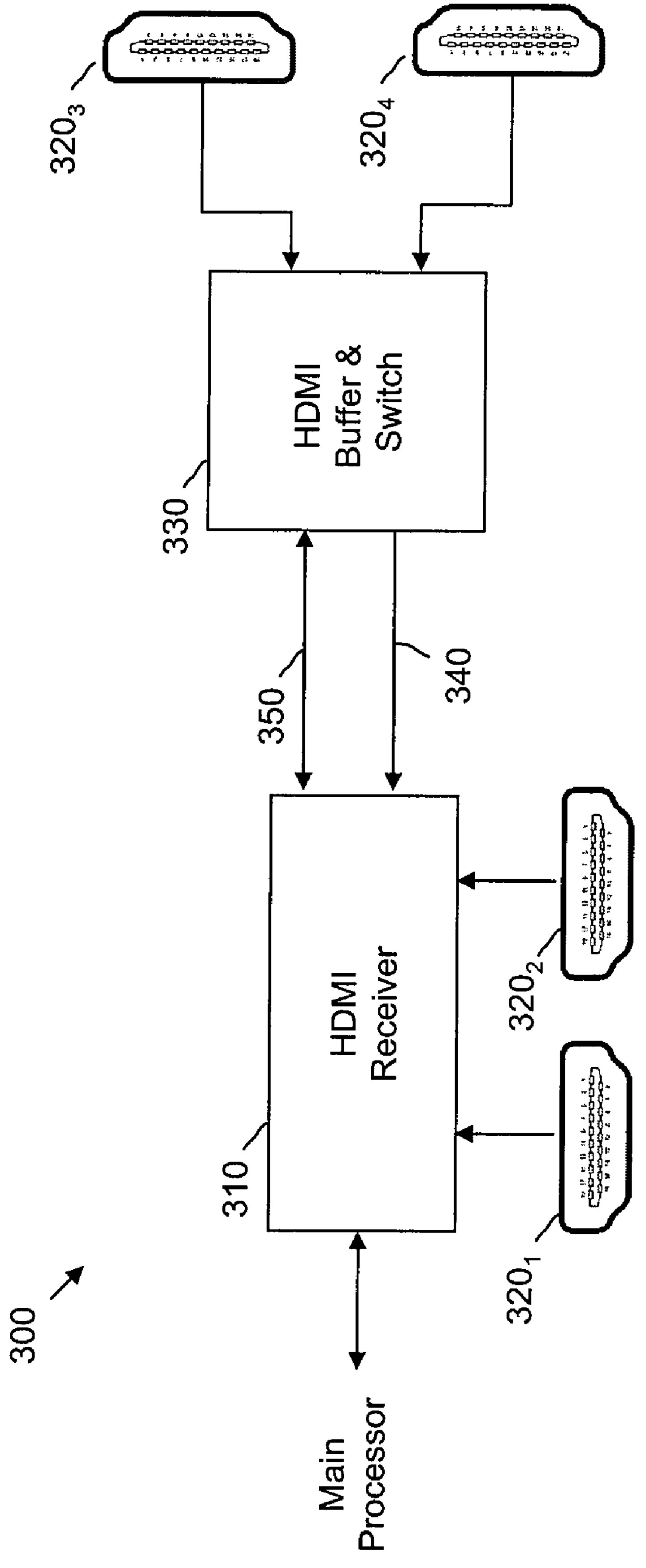
FIG. 3 depicts a block diagram of another system configured in accordance with one embodiment of the invention.

Referring now to FIG. 3, depicted is still another embodiment of a system in which, as described above with reference to FIG. 2A, may be implemented in a display device. In particular, system 300 includes an HDMI receiver circuit 310 coupled directly to a first HDMI input port $\mathbf{320}_1$ and a second HDMI input port $\mathbf{320}_2$, as shown. The HDMI inputs ports may be usable to provide the HDMI receiver circuit 310 with audio/video (AV) content received from a connected source device (not shown) in accordance with the HDMI communication standard.

In addition to being coupled to HDMI input ports $\mathbf{320}_1$ and $\mathbf{320}_2$, HDMI receiver circuit 310 is further electrically coupled to an HDMI buffer & switch circuit 330. In addition to providing the buffering functionality describes above, circuit 330 may further provide a switching function for connected HDMI input ports $\mathbf{320}_3$ and $\mathbf{320}_4$. In one embodiment, the HDMI input ports $\mathbf{320}_3$ and $\mathbf{320}_4$ are remotely-located from the HDMI receiver circuit 310 (e.g., on a different side of the display device).

In one embodiment, AV content may be received from a connected source device (not shown) by the buffer & switch circuit 330 via either HDMI input ports $\mathbf{320}_3$ or $\mathbf{320}_4$, and then provided to the HDMI receiver circuit 310 via TMDS line 340. In addition, the HDMI receiver circuit 310 may detect and subsequently control the buffer & switch circuit 330 via control line 350. As previously described, buffer & switch circuit 330 may be used to alleviate signal attenuation to/from remote HDMI ports, while also avoiding any additional processing overhead to the main processor which otherwise be incurred.

In addition to avoiding additional processing overhead for the device's main processor, the configuration of system 300 further alleviates the obstacle of the main processor not a sufficient number of available I/O pins to handle all of the various HDMI I/O ports. That is, by incorporating switching functionality into the circuit 330, multiple additional HDMI input ports (e.g., ports $\mathbf{320}_3$ and $\mathbf{320}_4$) may be added without using additional processor resources or I/O pins.

It should be appreciated that the system 300 of FIG. 3 is but one embodiment and that fewer or additional ports may be included, whether locally and/or remotely from the HDMI receiver circuit 310.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A display device comprising:

a main processor;

a high-definition multimedia interface (HDMI) receiver circuit electrically coupled to the main processor;

a first HDMI input port electrically coupled to the HDMI receiver circuit;

a buffer circuit electrically coupled to the HDMI receiver circuit, wherein the buffer circuit is configured to receive a control signal from the HDMI receiver circuit; and a second HDMI input port electrically coupled to the buffer circuit and configured to provide an HDMI connection to the display device from a source device, wherein the buffer circuit is electrically coupled between the second HDMI input port and the HDMI receiver circuit.

2. The display device of claim 1, wherein the HDMI receiver circuit is electrically coupled between the main processor and the buffer circuit.

3. The display device of claim 1, further comprising a third HDMI input port electrically coupled directly to the HDMI receiver circuit.

4. The display device of claim 1, wherein the HDMI receiver circuit is electrically couple to the main processor via a bus, and wherein the buffer circuit is electrically isolated from said bus.

5. The display device of claim 1, wherein the HDMI receiver circuit is configured to receive a Transition Minimized Differential Signal from the buffer circuit.

6. The display device of claim 1, wherein the buffer circuit further comprises switching circuitry for selecting between the second HDMI input port and one or more additional HDMI input ports under the direction of the HDMI receiver circuit.

7. A consumer electronic device comprising:

a main processor;

a high-definition multimedia interface (HDMI) transmitter circuit electrically coupled to the main processor;

a first HDMI input port electrically coupled to the HDMI transmitter circuit;

a buffer circuit electrically coupled to the HDMI transmitter circuit, wherein the buffer circuit is configured to receive a control signal from the HDMI transmitter circuit; and a second HDMI output port electrically coupled to the buffer circuit and configured to provide an HDMI connection to a connected device, wherein the buffer circuit is electrically coupled between the second HDMI output port and the HDMI transmitter circuit.

8. The consumer electronic device of claim 7, wherein the HDMI transmitter circuit is electrically coupled between the main processor and the buffer circuit.

9. The consumer electronic device of claim 7, further comprising a third HDMI output port electrically coupled directly to the HDMI transmitter circuit.

10. The consumer electronic device of claim 7, wherein the HDMI transmitter circuit is electrically couple to the main processor via a bus, and wherein the buffer circuit is electrically isolated from said bus.

11. The consumer electronic device of claim 7, wherein the HDMI transmitter circuit is configured to provide Transition Minimized Differential Signaling to the buffer circuit.

12. The consumer electronic device of claim 7, wherein the buffer circuit further comprises switching circuitry for selecting between the second HDMI output port and one or more additional HDMI output ports under the direction of the HDMI receiver circuit.

13. A chipset comprising:

a high-definition multimedia interface (HDMI) receiver circuit electrically coupled to a bus;

a first HDMI input port electrically coupled to the HDMI receiver circuit and configured to provide a first HDMI connection with a first source device;

a buffer circuit electrically coupled to the HDMI receiver circuit via a control line and a Transition Minimized Differential Signal (TMDS) line, and wherein the buffer circuit is detected and controlled by the HDMI receiver circuit via the control line; and a second HDMI input port electrically coupled to the buffer circuit and configured to provide a second HDMI connection with a second source device, wherein the buffer circuit is electrically coupled between the second HDMI input port and the HDMI receiver circuit.

14. The consumer electronic device of claim 13, wherein the HDMI receiver circuit is electrically coupled between a main processor and the buffer circuit.

15. The consumer electronic device of claim 13, wherein the buffer circuit is electrically isolated from the bus.

16. The consumer electronic device of claim 13, wherein the buffer circuit further comprises switching circuitry for selecting between the second HDMI input port and one or more additional HDMI input ports under the direction of the HDMI receiver circuit.

* * * * *

UNITED STATES PATENT AND TRADEMARK OFFICE

CERTIFICATE OF CORRECTION

PATENT NO. : 7,752,357 B2
APPLICATION NO. : 11/953570
DATED : July 6, 2010
INVENTOR(S) : Peter Shintani It is certified that error appears in the above-identified patent and that said Letters Patent is hereby corrected as shown below:

Replace "couple" with "coupled" in line 2 of claims 4 and 10.

Signed and Sealed this

Fourteenth Day of December, 2010

David J. Kappos
*Director of the United States Patent and Trademark Office*

UNITED STATES PATENT AND TRADEMARK OFFICE

CERTIFICATE OF CORRECTION

PATENT NO. : 7,752,357 B2
APPLICATION NO. : 11/953570
DATED : July 6, 2010
INVENTOR(S) : Peter Shintani It is certified that error appears in the above-identified patent and that said Letters Patent is hereby corrected as shown below:

Column 6, line 47 (claim 4, line 2) and Column 7, line 13 (claim 10, line 2),

Replace “couple” with “coupled”.

This certificate supersedes the Certificate of Correction issued December 14, 2010.

Signed and Sealed this
Fourth Day of January, 2011

David J. Kappos
*Director of the United States Patent and Trademark Office*